United States Patent
Ewers et al.

(10) Patent No.: US 9,151,354 B2
(45) Date of Patent: Oct. 6, 2015

(54) VALVE DEVICE

(75) Inventors: Benny Ewers, Vetlanda (SE); Lars Sonsterod, Sandared (SE)

(73) Assignee: ÖHLINS RACING AB, Upplands Vasby (SE)

(*) Notice: Subject to any disclaimer, the term of this patent is extended or adjusted under 35 U.S.C. 154(b) by 218 days.

(21) Appl. No.: 14/000,975

(22) PCT Filed: Feb. 24, 2012

(86) PCT No.: PCT/EP2012/053202
§ 371 (c)(1),
(2), (4) Date: Sep. 26, 2013

(87) PCT Pub. No.: WO2012/113929
PCT Pub. Date: Aug. 30, 2012

(65) Prior Publication Data
US 2014/0008556 A1    Jan. 9, 2014

(30) Foreign Application Priority Data
Feb. 25, 2011   (EP) .................................... 11156063

(51) Int. Cl.
*F16F 9/34*      (2006.01)
*F16F 9/46*      (2006.01)
*F16K 39/02*    (2006.01)

(52) U.S. Cl.
CPC . *F16F 9/34* (2013.01); *F16F 9/464* (2013.01); *F16F 2230/24* (2013.01); *F16K 39/024* (2013.01); *Y10T 137/86919* (2015.04); *Y10T 137/86976* (2015.04)

(58) Field of Classification Search
CPC ......... F16F 9/34; F16F 9/464; F16F 2230/24; F16F 9/466; F16F 9/465; F16K 39/024; F16K 11/04; F16K 11/044; F16K 1/443; F16K 1/52; F16K 1/54; Y10T 137/86976; Y10T 137/86919
USPC ............... 137/625.48, 625.49, 625.4, 630.15, 137/630.14, 627.5, 630.22, 630.16, 628, 137/629, 630; 188/322.13, 322.15, 282.5, 188/266.2, 266.4; 251/129.03, 117, 14
See application file for complete search history.

(56) References Cited

U.S. PATENT DOCUMENTS 5,188,150 A * 2/1993 Esplin ...................... 137/630.14
5,325,830 A * 7/1994 Hammer .................. 123/339.27
(Continued)

FOREIGN PATENT DOCUMENTS

DE   44 19 856 A1   12/1995
EP   1 759 256 A1   3/2007
EP   2 103 835 A1   9/2009
(Continued)

OTHER PUBLICATIONS

International Search Report re International Application No. PCT/EP2012/053202 dated Mar. 20, 2012, in 3 pages.

*Primary Examiner* — John Fox
*Assistant Examiner* — Michael R Reid
(74) *Attorney, Agent, or Firm* — Knobbe Martens Olson and Bear LLP

(57) ABSTRACT

A valve device for electrically regulating a pressure in a hydraulic fluid flow through the valve device in response to an actuating force during a normal operation and mechanically regulating said pressure during a fail-safe operation when no actuating force is present is disclosed. The valve device has a valve chamber. A first valve member is movable within the valve chamber in an axial direction to interact with a first valve seat in response to the actuating force in order to restrict the hydraulic fluid flow into the valve chamber during normal operation. The first valve member is spring-loaded away from the second seat in a direction opposite that of the actuating force such that the first valve member is movable in the axial direction. A second valve member forms a movable chamber wall portion defining a part of the valve chamber. The second valve member is spring-loaded in the direction of the actuating force. The second valve member has a through hole for allowing hydraulic fluid flow out of the valve chamber during normal operation. The spring-loaded first valve member is arranged to close the flow passage during fail-safe operation such that the pressure is mechanically regulated by the second valve member acting on the second valve seat.

20 Claims, 4 Drawing Sheets

(56) References Cited

U.S. PATENT DOCUMENTS

| | | | |
|---|---|---|---|
| 5,390,703 A * | 2/1995 | Tengesdal | 137/629 |
| 5,501,307 A | 3/1996 | Lars | |
| 2007/0235671 A1 * | 10/2007 | Feigel | 251/129.01 |
| 2008/0283135 A1 * | 11/2008 | Feigel | 137/625.48 |

FOREIGN PATENT DOCUMENTS

| WO | WO 2009/157841 A1 | 12/2009 |
|---|---|---|

* cited by examiner

VALVE DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a national stage application under 35 U.S.C. §371 of PCT Application No. PCT/EP2012/053202 designating the United States, filed Feb. 24, 2012. The PCT Application was published in English as WO 2012/113929 A1 on Aug. 30, 2012 and claims the benefit of European Patent Application EP 11156063.7, filed on Feb. 25, 2011.

BACKGROUND OF THE INVENTION

1. Field of the Invention

The present invention generally relates to the field of valve devices. More specifically, the present invention relates to a valve device for electrically regulating a pressure in a hydraulic fluid flow through the valve device in response to an actuating force during a normal operation and mechanically regulating said pressure during a fail-safe operation when no actuating force is present. In particular, the valve device is used in pilot valve assemblies in electrically controlled hydraulic damper devices.

2. Description of the Related Art

Electrically controlled hydraulic damper devices or shock absorbers may comprise pilot valves electrically actuated by, for example, a solenoid. The pilot valve is used to control a main valve, which in turn adjusts a flow of hydraulic fluid or damping medium between the working chambers, i.e. the rebound and compression chambers, of the shock absorber and thereby the damping characteristics. Such a shock absorber should preferably be able to handle electrical or mechanical malfunction of the solenoid or the control system without leaving the valves in an open state. Leaving the valves in an open state may result in a substantially unrestricted flow of hydraulic fluid between the damping chambers and consequently a lack of damping force.

A shock-absorber involving a fail-safe operation or mode in order to handle above mentioned malfunctions is presented in EP0400395 where a valve arrangement with two valve seats is suggested. In a normal operation or mode, a valve body is actuated by the solenoid in order to variably adjust a first valve restriction area when a first portion of the valve body interacts with a first valve seat. In a fail-safe operation mode or fail-safe mode, i.e. during fail-safe operation, a second portion of the same valve body is forced by spring means against a second valve seat thereby blocking the flow between the second portion of the valve body and the second valve seat. The valve arrangement also includes a through hole or passage with a fixed or constant restriction area to allow a small flow there through during fail-safe operation or the fail-safe operation mode. However, during the fail-safe operation mode, a high pressure difference over the through hole or passage can easily be generated due to the fixed restriction area. In other words, in the case of an increase in the amount of hydraulic fluid that needs to be displaced between the compression and rebound chamber, the fixed restriction area is unable to compensate for the change in the flow volume or amount of the flow. Thus, in addition to force exerting spring means, the pressure difference forces the second portion of the valve body against the second valve seat even further thereby generating an increase in the force that the second portion of the valve body exerts against the second valve seat. Thereafter, when the solenoid becomes active again the valve arrangement returns to its normal mode or operation. However, due to the increased force exerted on the valve body, the force required to transition from fail-safe operation or mode back to normal operation or mode during a pressurized state, i.e. during a driving state, may be difficult to generate by the solenoid. The valve arrangement is also likely to cause an abrupt transition with undesired pressure shocks in the system.

One attempt to solve the problem of transitioning between the two modes or operation modes is presented in EP0708268 where a disc-shaped member is used to block the radially arranged pilot passages in fail-safe operation mode. Due to through holes or passages in the disc-shaped member, the pressure acting on both sides of the member is essentially the same, and thereby the transition from fail-safe operation mode to normal operation mode does not require overcoming a force generated by a pressure difference as in EP0400395. However, one problem with the approach in EP0708268 is that relatively large plays or scopes (a gap between the disc-shaped member and the sliding surface of valve chamber walls and/or clearance in the interface between the plunger and the valve body) may be required in order to achieve smooth sliding operation. Such large plays or scopes are negative with respect to leakage in the interface between the disc-shaped member and the radial pilot passage(s). In particular, the large plays or scopes pose problems with the embodiment where an inclined surface is used to receive the disc-shaped member in fail-safe operation or mode. In this embodiment, there is a risk that the disc-shaped member is received in an inclined position, resulting in unpredictable closing of the pilot passage(s) and difficulties when returning to normal operation or mode.

Another solution is presented in EP1759256 which discloses a valve arrangement with two valve bodies arranged to adjust two cross sections arranged in series and which are opened and closed in a reciprocally proportional fashion. Similar to the problem above, there is a risk in this solution that the disc-shaped valve body may be positioned in an inclined position relative the other valve body resulting in an unwanted and unpredictable valve function.

SUMMARY OF THE INVENTION

It is an object of the present invention to provide a valve device for reliable and repeatable transition between fail-safe valve operation and normal valve operation to continuously regulate, in an intended and predictable manner, a flow of hydraulic fluid through the valve device and/or a pressure of the hydraulic fluid upstream of the valve device throughout its entire operation cycle including the transitions between its normal operation mode and fail-safe operation mode.

This and other objects are achieved according to the present invention by providing a valve device having the features defined in the independent claim. Various embodiments are defined in the dependent claims.

According to the invention, there is provided a valve device for electrically regulating a pressure in a hydraulic fluid flow q through the valve device in response to an actuating force F during a normal operation and mechanically regulating said pressure during a fail-safe operation when no actuating force is present. The valve device comprises a valve chamber, a first valve member and a second valve member. The first valve member is movable within said valve chamber in an axial direction to interact with a first valve seat in response to said actuating force F in order to influence said hydraulic fluid flow q into said valve chamber during normal operation. Thus, the first valve member is arranged to interact with the first valve seat to adjust the restriction area of the hydraulic fluid flow q into said valve chamber during normal operation. In other words, the movable first valve member variably restricts the hydraulic fluid flow q into said valve chamber during normal operation. The first valve member is spring-loaded in a direction opposite that of the direction of the actuating force F. Thereby, the counteracting forces enables the first valve member to be movable in said axial direction. The second valve member forms a movable chamber wall portion of said valve chamber. Thus, a movable portion of the valve chamber which defines a part of the valve chamber forms the second valve member. Furthermore, the second valve member is spring-loaded in said direction of the actuating force. Thus, the second valve member is spring-loaded in said axial direction towards said first valve member or in a direction opposite that of the direction of the spring-loaded first valve member. The second valve member has further a through hole for allowing said hydraulic fluid flow out of the valve chamber during normal operation. Thus, the second valve member is arranged with at least one through hole or flow passage through which the hydraulic fluid is allowed to flow out of the valve chamber during normal operation. The spring-loaded first valve member is further arranged to close said through hole during said fail-safe operation such that said pressure is mechanically regulated by said second valve member acting on said second valve seat. Thus, the through hole or flow passage is closable when the spring-loaded first valve member is in contact with the second valve member. In other words, the first valve member and the second valve member are configured to close the through hole or flow passage during the fail-safe operation such that said pressure is mechanically regulated by said second valve member acting on said second valve seat. Thus, the spring-loaded second valve member interacts with the second valve seat thereby mechanically regulating the pressure.

Thus, the present invention is based on the insight that by movably arranging the valve chamber wall portion that contains the outlet during normal operation, i.e. the flow passage for allowing the hydraulic fluid flow out of the valve chamber during normal operation, of the valve chamber and spring-loading this movable valve chamber wall portion, i.e. the second valve member, against a valve seat, i.e. the second valve seat, of the valve chamber wall in a direction opposite that of the spring-loaded first valve member then the outlet is closable by the first valve member during the fail-safe operation. When the outlet or flow passage is closed, the movable valve chamber wall portion, i.e. the second valve member, forms a valve member which is spring-loaded against the second valve seat resulting in a tight or leak-free check valve able to mechanically regulate the pressure of the hydraulic fluid in the valve chamber, i.e. allow fluid out of the chamber through a passage between the second valve seat and the thereto spring-loaded second valve member, during the fail-safe operation. In other words, the movable chamber wall portion forms a constituent chamber wall portion that is spring-loaded against the second valve seat for providing a check valve functionality which is able to mechanically regulate the pressure in the valve chamber or upstream of the flow. Since the pressure of the hydraulic fluid in the valve chamber or the upstream side of the second valve member exerts a force which acts on the second valve member, a passage is formed between the second valve member and the second valve seat at or above a certain pressure level, i.e. at or above a certain level of the force acting on the second valve member. Thus, the force required to open the second valve member relative the valve second seat needs to overcome the counteracting force exerted on the second valve member by the spring-load. The spring-load thus exerts a counteracting or spring-load force on the second valve member in a direction opposite that of the pressurized hydraulic fluid in the valve chamber in order to urge or force the second valve member against the second valve seat.

Since the outlet or the flow passage allows fluid out of the valve chamber during normal operation, the spring-loaded chamber wall portion or second valve member acts as an active valve member during the fail-safe operation and as a passive valve member during normal operation. It is understood that the outlet or flow passage, relative to the hydraulic fluid flow into the valve chamber, freely allows fluid out of the valve chamber during normal operation. Also, it is understood that the spring-load exerts a spring-load force on the second valve member or movable chamber wall portion which, in turn, is exerted against the second valve seat of the valve chamber wall. It is further understood that the second valve seat is fixed relative the valve chamber wall such that the second valve member or valve chamber wall portion is movable relative the second valve seat or the valve chamber.

Thus, by allowing the second valve member, which includes the valve chamber outlet or flow passage, to be movable and spring-loaded towards the second valve seat arranged on the valve chamber wall, and by arranging the actuatable first valve member to close the flow passage or valve chamber outlet during the fail-safe operation, an alternative or fail-safe outlet passage is obtained which is formed by a gap between the second valve member and the second valve seat when the second valve member is moved away from the second valve seat. The pressure of the hydraulic fluid in the valve chamber exerts a hydraulic fluid force on the second valve member during the fail-safe operation. However, the spring-load exerts a spring-load force on the second valve member which is directed oppositely relative to the hydraulic fluid force, i.e. the spring-load force counteracts the hydraulic fluid force. When this hydraulic fluid force is stronger or larger than the spring-load force direction, the second valve member is moved away from its abutting position against the second valve seat thereby forming the gap through which a fail-safe flow of hydraulic fluid is allowed to pass in order to decrease or regulate the pressure of hydraulic fluid in the valve chamber or on the upstream side of the second valve seat. Thus, during fail-safe operation, the spring-loaded second valve member mechanically regulates the pressure in the hydraulic fluid or hydraulic fluid flow through the valve device, thereby regulating or limiting the pressure drop over the valve device during the fail-safe operation.

It is understood that axial direction refers to the direction in which the actuating force together with the counteracting spring-load force actuates the first valve member. Thus, the first valve member is actuated by the actuating force acting in one direction and the counteracting spring-load force acting in the opposite direction allows the first valve member to be movable along the axial direction within the valve chamber, which in various embodiments of the invention also coincides with the axial direction of the actuation rod. It is also understood that the valve chamber is defined by the surrounding valve chamber walls.

The valve device can operate in two different operation modes or modes: in a normal operation mode or normal mode when an actuating force is present and received and in a fail-safe operation mode or fail-safe mode when the actuating force is not present and thus not received. In other words, during normal operation of the valve device when an actuating force is received the valve device is in the normal operation mode, thereby electrically controlling the valve device. During fail-safe operation of the valve device when no actuating force is received the valve device is in the fail-safe operation mode, thereby mechanically controlling the valve device. Fail-safe operation is associated with some type of malfunction of the actuating system, such as a solenoid that is unable to generate the actuating force, or damage to the electric system driving the solenoid.

The valve device comprises a valve chamber having an inlet for allowing the flow of hydraulic fluid into the valve chamber and an outlet for allowing the flow of hydraulic fluid out the valve chamber. Thus, the flow through the inlet is determined by the interaction or position of the first valve member relative to the first valve seat thereby restricting the hydraulic fluid flow (q) into said valve chamber. The flow passage in the second valve member defines the outlet or a normal flow passage during normal operation. However, during fail-safe operation when the flow passage or normal flow passage in the second valve member is closed, the outlet is defined by a fail-safe flow passage formed by the gap or opening, which is formed when the second valve member moves away from the second valve seat. During normal operation, the flow restriction area or inlet flow area of the inlet is restricted by the interaction of the first valve member with the first valve seat. During fail-safe operation or the fail-safe operation mode, the flow restriction area or inlet flow area of the inlet is determined by an opening in the valve chamber. The first valve member is adapted to receive an actuating force, for example it can be arranged to be mechanically coupled to a solenoid. Thus, the first valve member is arranged to be operated by the received actuating force during normal operation and interacts with the first valve seat in order to variably adjust or regulate the inlet flow area or flow restriction area of the inlet into the valve chamber. The second valve member is provided with a flow passage or normal flow passage which is closable by the first valve member. The first valve member is arranged to be spring-loaded towards the second valve member, and the second valve member is spring-loaded towards a second valve seat. Depending on the mode in which the valve operates, the flow out of the valve chamber can thereby take two different paths or flow paths.

In normal operation mode or during the normal operation mode of the valve device, the second valve member is forced in abutment with the second valve seat, i.e. the second valve member is in a closed position, and the first valve member is actuated towards the first valve seat to regulate the restriction area of the inlet and thus the pressure in the hydraulic fluid. Thus the flow passage or normal flow passage provided by the second valve member is open or unblocked, allowing a flow of hydraulic fluid out of the valve chamber.

During fail-safe operation, i.e. when the valve device is in the fail-safe operation mode, the spring-loaded first valve member is forced in abutment with the second valve member, thereby closing the flow passage or normal flow passage. The spring-loaded second valve member is arranged to at least axially move away from the second valve seat in response to a hydraulic pressure in the valve chamber, thereby opening the fail-safe flow passage between the second valve member and the second valve seat, allowing flow out of the valve chamber. The fail-safe flow passage thereby defines the outlet. Due to the spring-loading of the second valve member against the second valve seat, the flow out of the valve chamber and thus the pressure in the valve chamber is regulated. Put differently, when the normal flow passage provided by the second valve member is closed by the spring-loaded first valve member, the hydraulic pressure in the valve chamber and its corresponding pressure force increases and this hydraulic pressure force counteracts the spring-loading of the second valve member such that the second valve member is axially moved away from the second valve seat. The counteraction between the spring-loading of the second valve member and the force generated by the hydraulic pressure acting on the second valve member results in mechanical regulation of the flow out of the valve chamber. Spring-loading the second valve member is also advantageous with respect to pressure transients which may occur in the valve device when transitioning from normal operation to fail-safe operation. When the first valve member is forced against the second valve member in order to close the normal flow passage, i.e. when transitioning from normal operation to fail-safe operation, the spring-loading of the second valve member damps potential pressure transients.

Consequently, during normal operation:
the first valve member is operated by the received actuating force towards a first valve seat in order to variably adjust or restrict the flow into the valve chamber,
the normal flow passage provided by the second valve member is open or unblocked, and
the second valve member is in abutment with the second valve seat thereby blocking any flow of hydraulic fluid there between.

During fail-safe operation:
the first valve member is in abutment with the second valve member such that the normal flow passage provided by the second valve member is closed, and
the second valve is movable away from the second valve seat when the pressure of the hydraulic fluid is at or above a predetermined level in order to restrict or regulate the flow out of the valve chamber and thus the pressure of the hydraulic fluid.

During transition from normal operation to fail-safe operation:
the first valve member is forced towards the second valve member by the spring-loading in order to close the normal flow passage, and
the second valve is moved away from the second valve seat when the normal flow passage is closed and the pressure of the hydraulic fluid is at or above a predetermined level, thereby opening the fail-safe flow passage.

During transition from fail-safe to normal operation:
the first valve member is actuated and moved by the received actuating force towards the first valve seat thereby counteracting and overcoming the force exerted by the spring-load which thereby opens or unblocks the normal flow passage, and
when the normal flow passage is open or unblocked, the second valve member is affected only by the spring-loading which forces the second valve member against the second valve seat in order to close the fail-safe flow passage if this is open.

An advantage with the valve device according to the invention is that the spring-loaded second valve member mechanically regulates the hydraulic fluid pressure or hydraulic fluid flow through the valve device, thereby regulating or limiting the pressure drop over the valve device during the fail-safe operation which facilitates a quick and smooth transition from the fail-safe operation mode to the normal operation mode. Spring-loading the second valve member is also advantageous with respect to pressure transients which may occur in the valve device when transitioning from normal operation to fail-safe operation. When the first valve member is forced against the second valve member in order to close the normal flow passage, i.e. when transitioning from normal operation to fail-safe operation, the spring-loading of the second valve member damps potential pressure transients. Also, due to the mechanical regulation of the pressure drop, rapid changes in the hydraulic fluid flow and/or pressure drop may be avoided and/or decreased when transitioning between the operation modes. Another advantage of seating the spring-loaded second valve member against the second valve seat is that this arrangement provides a low sensitivity to contaminations and impurities in the hydraulic fluid due to the lack of small plays. Such small plays are unnecessary because no guiding means are required between the first valve member and the valve chamber walls.

In an embodiment of the invention, the valve chamber, the first valve member, the second valve member, the first valve seat and the second valve seat are arranged in a valve housing. In this configuration, the valve housing refers to a mechanical structure forming the valve chamber walls and also comprises portions arranged for interaction with, for example, the actuating system and portions arranged for fluid communication with, for example, working chambers in a damping device.

In another embodiment of the invention, the first valve member is spring-loaded against the first valve seat by a first spring means. In yet another embodiment of the invention, the first spring means is arranged between the first valve member and the first valve seat. In other words, the first springs means acts on the first valve member along the axial direction in a direction opposite to that of the actuating force received on the first valve member during normal operation. A valve characteristic of the valve device may be adjustable and/or tunable by selecting the first spring means from a group of first spring means having different spring characteristics or spring constants. In other words, a valve characteristic of the valve device, for example the flow restriction characteristics or the pressure regulating characteristics, may be adjusted or tuned by exchanging the first spring means. For example, if a first spring means having a large spring load or spring constant is chosen, the through hole of the second valve member may be rapidly closed when transitioning from normal operation mode to fail-safe operation mode, but on the other hand a large received actuating force may be required during normal operation to counteract the spring force of the first spring means. If a first spring means having a small spring load or spring constant is chosen, a smaller received actuating force may be required during normal operation to counteract the spring force of the first spring means, but the through hole of the second valve member may be more slowly closed when transitioning from normal operation mode to fail-safe operation mode.

In yet another embodiment of the invention, the first valve member is adapted to receive the actuating force via an actuating rod. In other words, the actuating force is transmitted to the first valve member via an actuating rod. Hereby the source of the actuating force, for example a solenoid, can be arranged at a distance from the first valve member allowing a more flexible design layout of the valve. The actuating force may be received by arranging the first valve member and the actuating rod in abutment with each other. The actuating rod may be arranged coaxially with the first valve member. Thus, the actuating rod extends in the axial direction.

In yet another embodiment of the invention, the actuating rod is arranged to be guided by a valve device portion, and the first valve member is arranged to be guided by the actuating rod to limit the actuating rod and the first valve member to be movable in the axial direction. The first valve member is hereby limited to move in the axial direction only relative to the valve chamber and thereby relative to the first valve seat. Put differently, the first valve member is guided axially by the valve device by means of the actuating rod. This is advantageous because no additional guiding means are required to achieve a reliable operation with low leakage when actuating the first valve member towards the first valve seat in order to adjust the flow into the chamber. Because no guiding means are required between the first valve member and the valve chamber walls, small plays are avoided and the valve device is thereby even further less sensitive to contamination and impurities in the hydraulic fluid.

In yet another embodiment of the invention, the second valve member comprises a through hole or hole. The first valve member and/or actuating rod may furthermore be arranged to extend through the through hole or hole in the second valve member. In other words, a portion of the body formed by the first valve member and actuating rod may extend through the through hole or hole. Depending on the axial position of the actuating rod and the first valve member and also depending on the geometry of the actuating rod and first valve member, either the first valve member or the actuating rod or both extend through the through hole. Furthermore, the second valve member may be arranged coaxially with the first valve member. The through hole and/or the second valve member may be circular. The through hole may be provided in the radial center of the second valve member. The first valve member and/or the actuating rod extending through the through hole may be circular. The first valve seat and/or the second valve seat may be circular. An embodiment where the through hole or hole, the actuating rod, the first and second valve seats and the first and second valve members are all circular and are arranged coaxially is advantageous because of the ease of manufacturing and good sealing possibilities between the valve device components.

In yet another embodiment of the invention, the flow passage or normal flow passage is defined by a space between an inner wall portion of said through hole and the first valve member and/or the actuating rod extending there through.

In yet another embodiment of the invention, the first valve member is provided with a first annular closing surface arranged to contact a second annular surface of the second valve member in order to close the flow passage or normal flow passage. It is understood that the second annular surface refers to a surface of the second valve member being oppositely arranged to the closing surface of the first valve member. Put differently, the first valve member has a first annular closing surface arranged to be in contact with an oppositely arranged edge of a through hole wall when the flow passage or normal flow passage is closed.

In yet another embodiment of the invention, the first annular closing surface is tapered towards said flow passage or normal flow passage. In other words, the first annular closing surface of the first valve member may be conically shaped towards the flow passage or normal flow passage, such that the portion of the closing surface having the smallest diameter is directed towards the flow passage or normal flow passage when the first valve member is moved towards the second valve member in order to close the flow passage or normal flow passage. Hereby the flow passage or normal flow passage may be more efficiently sealed. Put differently, the first and second annular closing surfaces may provide a tighter seal when in contact.

In yet another embodiment of the invention, the second annular closing surface is tapered in the flow direction of the flow passage or normal flow passage. Hereby the flow passage or normal flow passage may be more efficiently sealed due to the tapered surface.

In yet another embodiment of the invention, the second valve member comprises at least one orifice for allowing hydraulic fluid flow out of the chamber. In other words, in addition to the flow passage or normal flow passage being arranged to be closable by the first valve member, the second valve member comprises at least one orifice. In yet another embodiment, at least one of the orifices may be arranged such that it is not closeable by the first valve member, i.e. the restriction area of the orifice is fixed. By providing such an orifice not being closable by the first valve member, a larger degree of freedom is available when designing the valve device for a desired pressure-flow characteristic. For example, while in fail-safe operation and the hydraulic fluid flow through the valve device is small such that the second valve member is resting against the second valve seat, hydraulic fluid can flow out of the chamber through the orifice. In such a case, the flow characteristics are solely determined by the design of the at least one orifice. In a typical embodiment, the flow characteristics at large flows are mostly determined by the opening between the second valve member and the second valve seat. In yet another embodiment, all of the at least one orifice(s) are arranged to be closeable by the first valve member.

In yet another embodiment of the invention, the valve device comprises at least one orifice with a fixed restriction area for allowing hydraulic fluid flow into the chamber. In other words, the valve device comprises at least one orifice with a fixed restriction area being arranged in parallel to the valve chamber inlet flow passage provided by the first valve member interacting with the first valve seat. By providing at least one such orifice, the pressure-flow characteristics can be customized by having two independent inlets to the valve chamber in parallel. Having at least one additional inlet with a fixed restriction area is also advantageous from another point of view: in the case of, for example, mechanical damage to the actuating rod and/or first valve member such that the first valve member is locked against the first valve seat, hydraulic fluid can still flow into the valve chamber (and thereby through the valve device) via the at least one fixed restriction area.

In yet another embodiment of the invention, the valve device comprises at least one orifice for bypassing the valve chamber. In other words, the valve device may be provided with at least one orifice through which hydraulic fluid can flow in order to bypass the valve chamber and the restrictions at the inlet and outlet of the valve chamber. Put differently, the valve device may be provided with at least one orifice through which hydraulic fluid can flow independently of the actuating force received. By providing at least one such orifice, the pressure-flow characteristics of the valve device can be customized by having at least two independent passages in parallel, i.e. one passage via the valve chamber and at least one orifice. Having at least one orifice bypassing the valve chamber and its associated restrictions is also advantageous, for example, in the case of damage to one or several of the members of the valve device such that the flow through the chamber is blocked. At least one of the orifice(s) may be an orifice with a fixed restriction area.

In yet another embodiment of the invention, the second valve member is spring-loaded against the second valve seat by a second spring means. The second spring means may be a helical compression spring or a cup spring. The first spring means may have a lower spring load than the second spring means. Put differently, during both normal and fail-safe operation, a smaller force may be required to compress the first spring means a certain length compared to compressing the second spring means the same length when the spring means are arranged in the valve device. Hereby, because of the lower spring load of the first spring, the second valve member will not be released from the second valve seat by means of the first spring means during fail-safe operation. The first spring means is intended to force the first valve member towards the second valve member such that the normal flow passage is closed, thereby allowing the second valve member to be released in response to a pressure of the hydraulic fluid in the valve chamber. The pressure in the valve chamber will act on both the first and the second valve members such that they are moved as a single unit.

Furthermore, a valve characteristic of the valve device may be adjustable and/or tunable by selecting the first and/or second spring means from groups of first and second spring means having different spring characteristics or spring constants. In other words, for a given received actuating force, a valve characteristic of the valve device may be adjustable and/or tunable. The valve characteristic may, for example, be the pressure regulation characteristics and/or the flow restriction characteristics and/or the opening pressure threshold of the valve device. In particular, the valve characteristic during fail safe operation mode may be tuned or adjusted by selecting the second spring means from a group of second spring means having different spring characteristics or spring constants. Thus, a different counteraction between the spring-loading of the second valve member and the force generated by the hydraulic pressure acting on the second valve member may be achieved, thereby, during fail safe operation mode, changing the pressure regulation characteristics and/or the flow restriction characteristics and/or the opening pressure threshold of the valve device. A valve characteristic of the valve device may also be adjustable and/or tunable by selecting the first spring means from a group of first spring means having different spring characteristics or spring constants. Thereby, the ratio of the spring constants between the first and second spring means may be changed, therefore changing a valve characteristic of the valve device.

In yet another embodiment of the invention, the second valve member is disk-shaped and flexible in the axial direction. Hereby, the second valve member may be resiliently arranged in the valve housing such that the valve member acts as a spring itself and can thereby be spring-loaded against the second valve seat. A valve characteristic of the valve device may be adjustable and/or tunable by selecting the disk-shaped and flexible second valve member from a group of second valve members having different stiffness or flexibility characteristics. In other words, for a given received actuating force, a valve characteristic of the valve device may be adjustable and/or tunable. The valve characteristic may for example be the pressure regulation characteristics and/or the flow restriction characteristics and/or the opening pressure threshold of the valve device. In particular, the valve characteristic during fail safe operation mode may be tuned or adjusted by selecting the disk-shaped and flexible second valve member from a group of second valve members having different stiffness or flexibility characteristics. Thus, a different counteraction between the spring-loading of the second valve member and the force generated by the hydraulic pressure acting on the second valve member may be achieved, thereby, during fail safe operation mode, changing the pressure regulation characteristics and/or the flow restriction characteristics and/or the opening pressure threshold of the valve device. A valve characteristic of the valve device may also be adjustable and/or tunable by selecting the first spring means from a group of first spring means having different spring characteristics or spring constants. Thereby, the degree of spring loading of the first valve member in relation to the degree of spring loading of the second valve member may be changed, therefore changing a valve characteristic of the valve device.

In yet another embodiment, the valve device may furthermore comprise an abutment element against which the second valve member is resiliently biased to spring-load the second valve member against the second valve seat. The abutment element is preferably an annular abutment element. In other words, the valve device may be provided with an abutment element or annular abutment element, and the second valve member may be biased between the abutment element and the second valve seat such that the second valve member is spring-loaded against the second valve seat. Put differently, the valve device may furthermore comprise an abutment element or annular abutment element arranged to force the flexible second valve member against the second valve seat, wherein the annular abutment member acts on the second valve member at a different radial position than the second valve seat, such that the second valve member is resiliently biased and thereby spring-loaded against the second valve seat. Hereby, by biasing the second valve member, it is spring-loaded without requiring any additional spring means. This embodiment is also advantageous because the number of components and in particular the number of complex and finely machined components of the valve device is reduced. The need for adjusting, for example, the spring forces in the valve device is also reduced because one component in the axial direction is eliminated. Another advantage is that no radial guiding of the second valve member, by, for example, portions of the second valve member being guided by the walls of the valve chamber, is required due to the disk-shape of the second valve-member. Thereby, the reliability and the sensitivity to contamination and impurities in the hydraulic fluid are improved due to the lack of small plays between the second valve member and the valve chamber walls.

In yet another embodiment of the invention, the abutment element or annular abutment element may be a portion of a valve housing. The abutment element or annular abutment element may be arranged to contact the second valve member at a larger radius than the radius of the second valve seat. The abutment element or annular abutment element may alternatively be arranged to contact the second valve member at a smaller radius than the radius of the second valve seat.

In yet another embodiment of the invention, the second valve member is provided with at least one portion which is slidably arranged along the walls of the valve chamber in order to limit radial movement of the second valve member. In other words, the second valve member is provided with at least one portion, wherein upon axial movement of the second valve member, the at least one portion slides along the walls of a valve chamber such that movement of the second valve member is limited in the radial direction. The at least one portion may be arranged to limit the second valve member to be moveable in the axial direction. The at least one portion arranged to limit radial movement may extend into the valve chamber such that the portion(s) are slidably arranged along the walls of the valve chamber. Because of the forces acting on the second valve member as a result of being spring-loaded and as a result of the pressure acting on it, the movement of the second valve member is aided and the sensitivity for contamination and impurities in the hydraulic fluid is decreased, even if a relatively small play is used between the at least one portion and the walls of the valve chamber. In other embodiments, the play between the at least one portion of the second valve member and the walls of the wall chamber is relatively large, thereby achieving a valve device with low sensitivity to contamination and impurities in the hydraulic fluid.

In yet another embodiment of the invention, the normal flow passage is configured, relative to the restricted hydraulic fluid flow (q) into said valve chamber, to unrestrictedly allow hydraulic fluid flow out of the chamber during normal operation. In other words, the diameter of the through hole of the second valve member relative to the diameter of the first valve member and/or the actuating rod extending through the second valve member is chosen in relation to the distance between the through hole and the closing portion of the first valve member such that the flow out of the chamber is substantially unrestricted during normal operation. It is understood that substantially unrestricted in this context refers to a restriction of insignificant size compared to the restriction formed by the first valve member interacting with the first valve seat in normal operation mode. Hereby, the restriction of the valve device in normal operation mode is determined by the first valve member interacting with the first valve seat in response to a received actuation force.

In yet another embodiment of the invention, the first valve member and the first valve seat are arranged to, relative to the restricted hydraulic fluid flow (q) out of said valve chamber, unrestrictedly allow hydraulic fluid flow into the chamber during said fail-safe operation. In other words, the diameter of the first valve seat, and thereby the diameter of the inlet, and the size of the first valve member is configured such that the flow into the chamber is substantially unrestricted during fail-safe operation. Put differently, the diameter of the valve chamber inlet is chosen such that the flow is unrestricted through the inlet, and the length between the closing portion of the first valve member and the portion of the first valve member arranged to interact with the first valve seat is chosen such that the flow between the valve seat and the first valve member is substantially unrestricted. It is understood that substantially unrestricted in this context refers to a restriction of insignificant size compared to the restriction formed by the interaction between the second valve member and the second valve seat in fail-safe operation mode. Hereby, the restriction of the valve device in fail-safe operation mode is determined by the second valve member interacting with the second valve seat.

In yet another embodiment of the invention, the actuating rod is arranged to extend through an inlet through hole of said valve chamber.

In yet another embodiment of the invention, an effective flow area between the second valve member and the second valve seat is proportional to the pressure of the hydraulic fluid in the valve chamber in fail-safe operation mode. Thereby the hydraulic pressure in the valve chamber is limited in fail-safe operation mode. In other words, the second valve member is, in fail-safe operation mode, arranged to be increasingly distanced from the second valve seat when the pressure of the hydraulic fluid in the valve chamber increases.

In yet another embodiment, the valve device further is provided with a third valve member arranged in the valve chamber. The third valve member may be disk-shaped, in particular it may be flexible in the axial direction. The third valve member may be fixed in the axial direction to the valve chamber. In particular, an annular portion of the third valve member may be fixed in the axial direction to a valve chamber wall by fastening means. The annular portion fixed to the valve chamber wall may be of a larger radius than the first valve seat. The third valve member may furthermore be arranged between the first valve member and the first valve seat such that hydraulic fluid flow into the valve chamber is restricted by the third valve member interacting with the first valve seat during normal operation. In other words, the flow into the valve chamber may be restricted by an inlet flow passage formed between the third valve member and the first valve seat. In yet another embodiment, the third valve member is provided with a through hole being closable by said first valve member during normal operation. The through hole forms an additional inlet flow passage for hydraulic fluid flow into the valve chamber during fail-safe operation. In other words, the through hole in the third valve member is closed during normal operation by the first valve member. During fail-safe operation, the first valve member is released from the third valve member, thereby opening an additional inlet flow passage defined by the through hole. Hereby, two parallel inlet flow passages are open during fail-safe operation in order to allow hydraulic fluid flow into the valve chamber.

BRIEF DESCRIPTION OF THE DRAWINGS

These and other aspects of the present invention will now be described in more detail, with reference to the accompanying drawings showing a currently preferred embodiment of the invention, wherein.

DETAILED DESCRIPTION OF THE PREFERRED EMBODIMENT

In the following description, embodiments of the present invention are described with reference to valve devices where the first valve member is actuated via an actuating rod extending through the second valve member, where the first valve member is spring-loaded by a helical compression spring arranged between the first valve member the first valve seat, and where the second valve member is spring-loaded by a helical compression spring, or by a cup spring or by acting as a spring itself by being resiliently biased. It should be noted that the present invention is also applicable with other types of actuating configurations and other forms of spring-loading. Furthermore, the valve device is preferably used in pilot valve assemblies in electrically controlled hydraulic damper devices.

Figure 1:
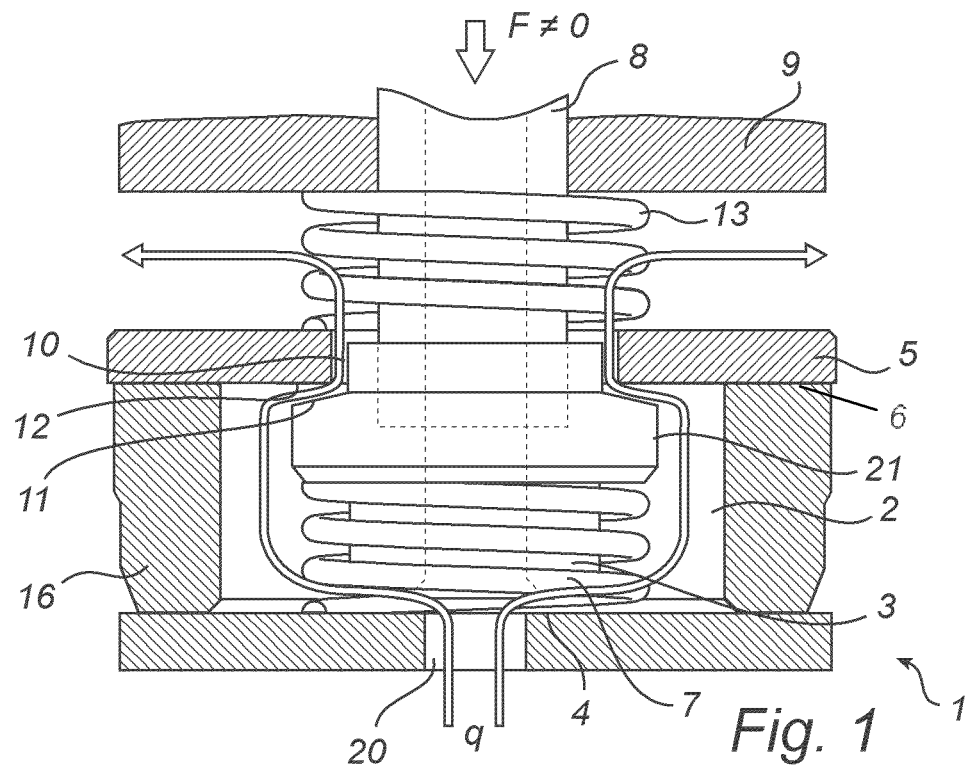
FIG. 1 is a schematic illustration of a valve device in normal operation mode in accordance with an embodiment of the present invention.
Figure 2:
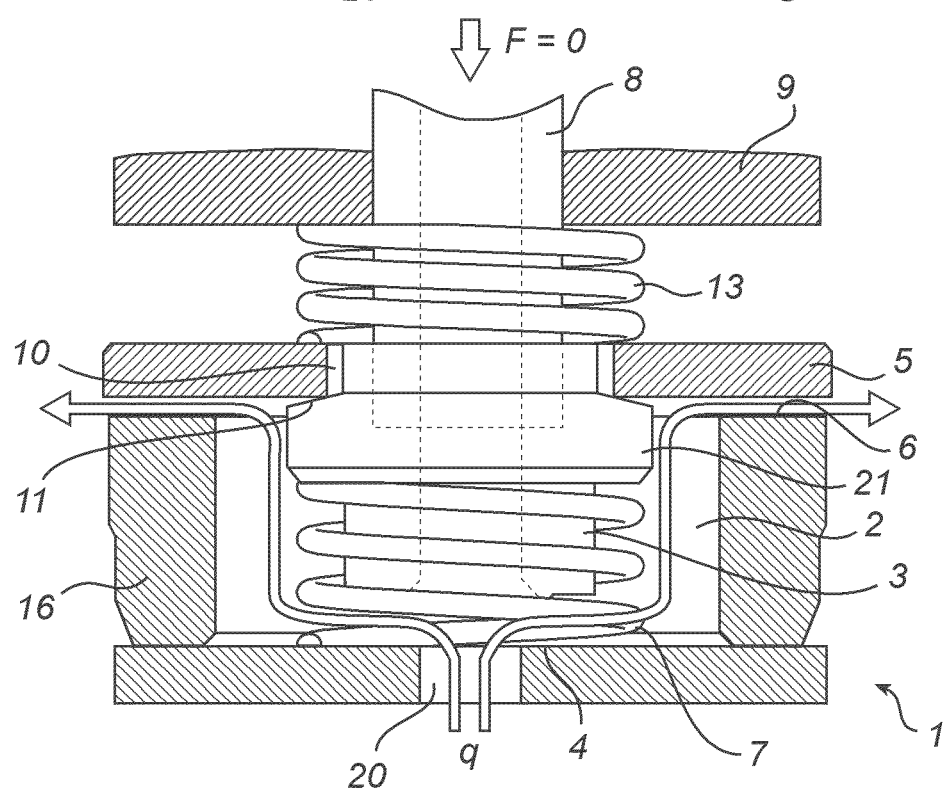
FIG. 2 is a schematic illustration of the valve device according to FIG. 1 in fail-safe operation mode.

FIG. 1 and FIG. 2 illustrate a valve device 1 having a valve housing 16. In FIG. 1-4 this housing 16 comprises a cylindrical portion and bottom portion which together form a chamber wall defining a part of the chamber. A circular first valve member 3 is arranged within a valve chamber 2 arranged in the valve housing 16. The first valve member 3 is movable, in response to an actuating force F, within the valve chamber 2 along an axial direction against a first valve seat 4. The valve chamber 2 is defined by valve chamber walls of the valve housing 16 and by a second valve member 5 forming a chamber wall portion. Put differently, the valve chamber wall portion forms a second valve member which is movable relative to the housing 16 or the valve chamber wall.

The first valve member 3 is collinearly arranged in abutment with a circular actuating rod 8, through which an actuating force F is received. The actuating force F may be generated by a solenoid device or the like. The actuating rod 8 is guided by a portion 9 of the valve housing 16, thereby limiting the actuating rod 8 and the first valve member 3 to be movable in the axial direction only. The first valve member 3 is thereby actuatable in the axial direction and able to be interact with a circular first valve seat 4. The valve chamber inlet 20 is arranged coaxially with the first valve seat 4, such that when the first valve member 3 is actuated to interact with the first valve seat 4, the hydraulic fluid flow into the valve chamber 2 is restricted. The first valve member 3 is inwardly spring-loaded by a helical compression spring 7, i.e. the first valve member 3 is spring-loaded in a direction away from the first valve seat 4. In this case, inwardly refers to a direction towards the interior of the valve chamber. In other words, the first spring 7 acts on the first valve member 3 in an opposite direction to the receivable actuation force F. During normal operation, the valve member 3 is thus affected by the actuating force F acting in a first direction and the spring-load of the first spring 7 acting in a second and opposite direction resulting in the first valve member 3 being movable in the axial direction. One end of the helical compression spring 7 acts on a radially extending projection 21 of the first valve member 3 and the other end acts on a wall surface of the chamber. Helical compression spring 7 is coaxially arranged with the first valve seat 4.

The second valve member 5 is movable in the same axial direction as the first valve member 3. Thus, the first valve member 3 and the second valve member 5 are spring-loaded along the same axial direction, but in opposite directions relative to each other. In other words, the first valve member 3 and the second valve member 5 are spring-loaded opposite to each other along the axial direction. The second valve member 5 is arranged coaxially with the actuating rod 8. The second valve member 5 is spring-loaded by a helical compression spring 13 against a second valve seat 6 in an axial direction towards the first valve member 3. When the spring-loaded second valve member 5 rests against the second valve seat 6 they are in contact with a contact area having a sufficiently large size to provide a robust interaction of the valve members. In other words, the first and second valve members are both spring-loaded in a direction towards each other. The spring 13 acts in one end on a portion 9 of a valve housing 16 and in the other end on the second valve member 5. The actuating rod 8 extends through the spring 13 and through a circular and central through hole 10 of the second valve member 5. During normal operation, hydraulic fluid is allowed through a flow passage or normal flow passage which is formed by the space between the sidewall of the through hole 10 and the actuating rod 8.

In FIGS. 2, 4, 6 and 8 the first valve member 3 is in contact with the second valve member 5 thereby closing or blocking the flow passage through the through hole 10. Although this embodiment shows a central through hole, the second valve member 5 may instead comprise a through hole at any radial position as long it is closable by the first valve member 3 during the fail-safe operation. Alternatively, the second valve member 5 may be provided with a plurality of through holes which are closable by the first valve member 3. The through hole(s) is closable such that the flow of hydraulic fluid is prevented or blocked from flowing there through.

FIG. 1 illustrates the valve device during normal operation. Normal operation with this embodiment is characterized in that:

an actuating force F≠0 is received by the actuating rod 8, thereby forcing the actuating rod 8 and the first valve member 3 towards the first valve seat 4, the spring 13 acts on the second valve member 5 in a direction towards the second valve seat 6, such that the second valve member 5 rests against the second valve seat 6, the hydraulic fluid flow q into the chamber 2 is restricted by the opening between the first valve member 3 and the first valve seat 4, and the normal flow passage formed by the space between the sidewall of the through hole 10 and the actuating rod 8 allows hydraulic fluid flow q out of the chamber 2.

FIG. 2 illustrates the valve device during fail-safe operation. Fail-safe operation this embodiment is characterized in that:

no actuating force is received by the actuating rod 8, i.e. F=0, the first valve member 3 is forced by the spring 7 against the second valve member 5 such that the flow passage formed by the space between the sidewall of the through hole 10 and the actuating rod 8 is closed, the first valve member 3 is distanced from the first valve seat 4 such that a hydraulic fluid flow q is allowed into the chamber 2, a pressure P of the hydraulic fluid in the chamber 2 acts on both the first and second valve members such that the second valve member 5 is distanced from the second valve seat 6, and the spring 13 acts on the second valve member 5 in an opposite direction to the pressure-generated force acting thereon, such that a fail-safe flow passage between the second valve member 5 and the second valve seat 6 is restricted, thereby allowing a restricted flow of hydraulic fluid q out of the chamber.

Figure 3:
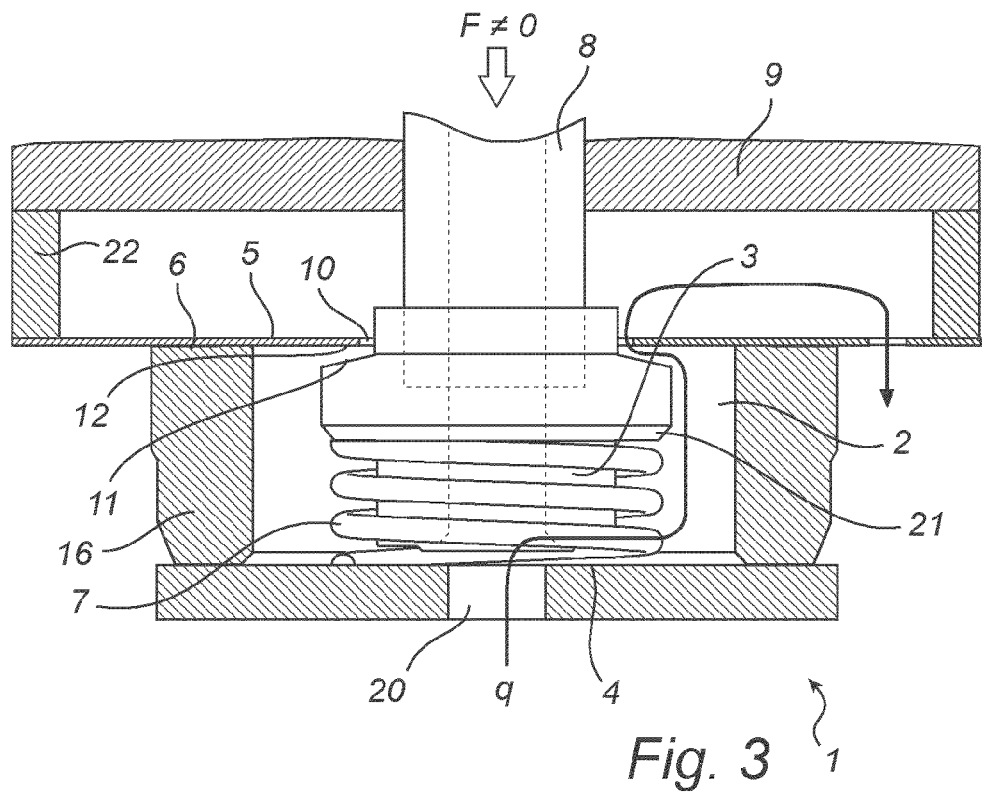
FIG. 3 is a schematic illustration of a valve device in normal operation mode in accordance with another embodiment of the present invention.
Figure 4:
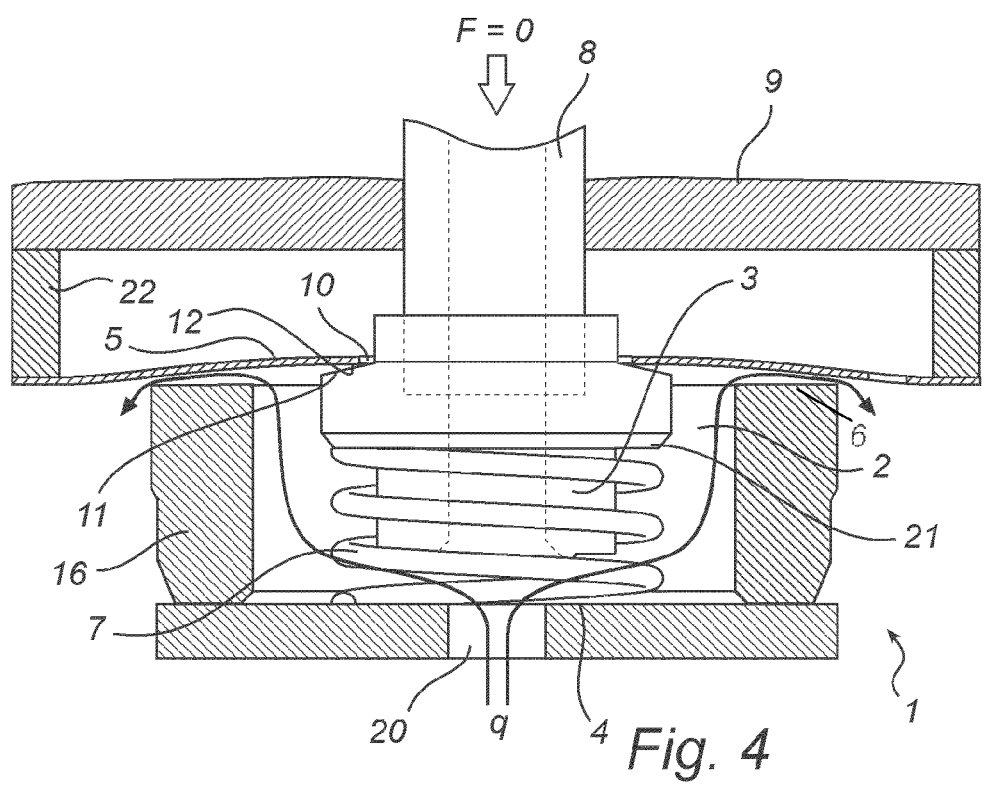
FIG. 4 is a schematic illustration of the valve device according to FIG. 3 in fail-safe operation mode.

FIG. 3 and FIG. 4 illustrate another embodiment of the valve device 1 having a valve housing 16. A first circular valve member 3 is arranged within a valve chamber 2 arranged in the valve housing 16, where the first valve member 3 is movable within the valve chamber 2. The valve chamber 2 is defined by walls of the valve housing 16 and by a second valve member 5 forming a chamber wall portion. As mentioned above, the valve chamber wall portion thus forms a second valve member that is movable relative to the housing or the valve chamber wall 16.

The first valve member 3 is collinearly arranged in abutment with a circular actuating rod 8, through which an actuating force F is received. The actuating rod 8 is guided by a portion 9 of the valve housing 16, thereby limiting the actuating rod 8 and the first valve member 3 to be movable in the axial direction only. The first valve member is thereby actuatable in an axial direction towards a circular first valve seat 4. The valve chamber inlet 20 is arranged coaxially with the first valve seat 4, such that when the first valve member 3 is actuated to interact with the first valve seat 4, the hydraulic fluid flow into the valve chamber 2 is restricted. The first valve member 3 is inwardly spring-loaded by a helical compression spring 7, i.e. the first valve member 3 is spring-loaded in a direction away from the first valve seat 4. In other words, the first spring 7 acts on the first valve member 3 in an opposite direction to the receivable actuation force F. One end of the helical compression spring 7 acts on a radially extending projection 21 of the first valve member and the other end acts on a wall of the chamber 2.

The second valve member 5 is arranged coaxially with the actuating rod 8. The second valve member 5 is disk-shaped and is flexible. In this configuration, the second valve member 5 is at least flexible in the axial direction in order to provide a spring-load in this direction. The second valve member 5 is resiliently biased between an annular abutment element 22, being formed by a portion of the valve housing 16 and the second valve seat 6, thereby spring-loading the second valve member 5 against the second valve seat 6 in an axial direction towards the first valve member 3. In other words, the first and second valve members are both spring-loaded in a direction towards each other. The annular abutment element 22 has a larger radius and is arranged coaxially with the second valve seat 6. In other embodiments, the annular abutment element 22 may have a smaller radius than the second valve seat 6. The annular abutment element 22 and the second valve seat 6 overlap each other in the axial direction, thereby the second valve member 5 may be biased there between. The actuating rod 8 extends through a circular through hole 10 of the second valve member 5. A normal flow passage is formed by the space between the wall of the through hole 10 and the actuating rod 8.

FIG. 3 illustrates the valve device during normal operation. Normal operation with this embodiment is characterized in that:

an actuating force F≠0 is received by the actuating rod 8, thereby forcing the actuating rod 8 and the first valve member 3 towards the first valve seat 4, the second valve member 5 rests against the second valve seat 6, the hydraulic fluid flow q into the chamber 2 is restricted by the opening between the first valve member 3 and the first valve seat 4, the normal flow passage formed by the space between the wall of the through hole 10 and the actuating rod 8 allows hydraulic fluid flow q out of the chamber 2.

FIG. 4 illustrates the valve device during fail-safe operation. Fail-safe operation with this embodiment is characterized in that:

no actuating force is received by the actuating rod 8, i.e. F=0, the first valve member 3 is forced by the spring 7 against the second valve member 5 such that the normal flow passage formed by the space between the wall of the through hole 10 and the actuating rod 8 is closed, the first valve member 3 is distanced from the first valve seat 4 such that a hydraulic fluid flow q is allowed into the chamber 2, a pressure P of the hydraulic fluid in the chamber 2 acts on both the first and second valve members such that the second valve member 5 is distanced from the second valve seat 6, the spring-loading of the second valve member 5 counteracts the pressure-generated force acting thereon, such that the fail-safe flow passage between the second valve member 5 and the second valve seat 6 is restricted, thereby allowing a restricted flow q of hydraulic fluid out of the chamber 2.

Figure 5:
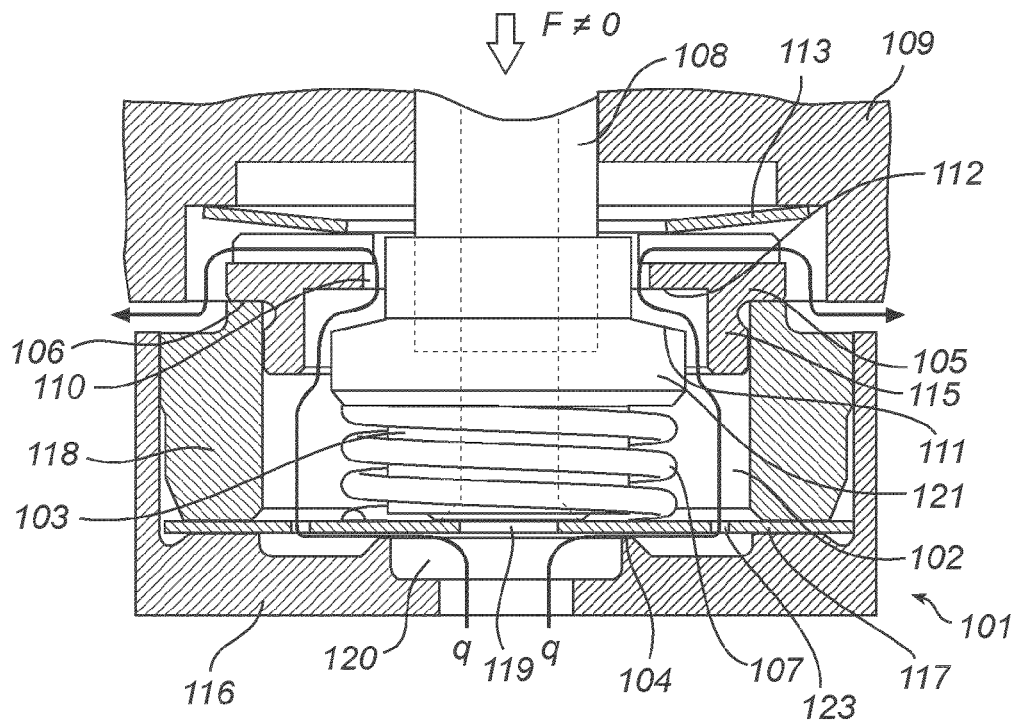
FIG. 5 is an illustration of a valve device in normal operation mode in accordance with yet another embodiment of the present invention.
Figure 6:
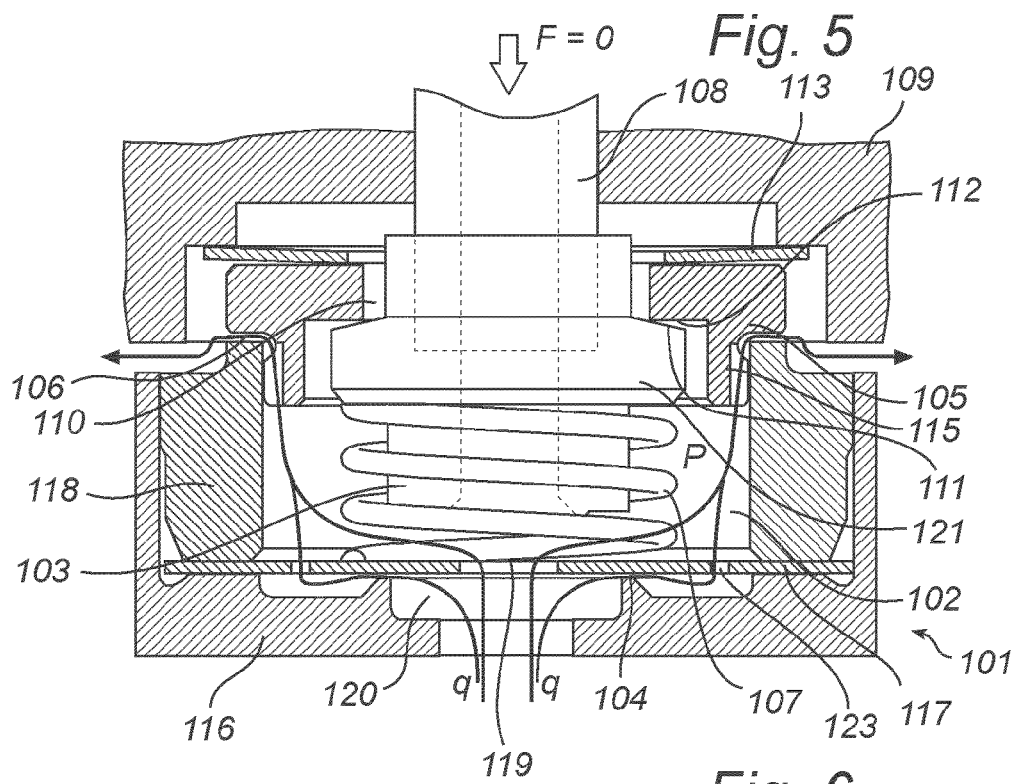
FIG. 6 is an illustration of the valve device according to FIG. 5 during fail-safe operation.

FIG. 5 and FIG. 6 illustrate yet another valve device 101 having a valve housing 116. A first circular valve member 103 is arranged within a valve chamber 102 arranged in the valve housing, where the first valve member 103 is movable within the valve chamber 102. The valve chamber 102 is defined by walls of the valve housing 116 and by a second valve member 105 forming a chamber wall portion. As mentioned above, the valve chamber wall portion thus forms a second valve member 105 which is movable relative the housing or the valve chamber wall 116.

The first valve member 103 is collinearly arranged in abutment with a circular actuating rod 108, through which an actuating force F is received. The actuating rod 108 is guided by a portion 109 of the valve housing 116, thereby limiting the actuating rod 108 and the first valve member 103 to be movable in the axial direction only. The first valve member 103 is thereby actuatable in an axial direction towards a circular first valve seat 104.

A disk-shaped third valve member 117 that is flexible in the axial direction is arranged in the chamber 102 between the first valve member 103 and the first valve seat 104. The third valve member 117 is fixed to the valve housing 116 by means of a circular fastening element 118 being arranged to sandwich an annular portion of the third valve member 117 between the valve housing 116 and the fastening element 118. The fastening element 118 is fixed to the valve housing 116 by being wedged between the interior walls of the valve housing 116. The third valve member 117 comprises a through hole 119 in the centre of the valve member. The third valve member 117 further comprises additional through holes 123 being arranged at a radius larger than the diameter of the first valve seat 104.

The valve chamber inlet 120 is arranged coaxially with the first valve seat 104, such that when the first valve member 103 is actuated to interact with the first valve seat 104 and the third valve member 117, the hydraulic fluid inlet flow to the valve chamber 102 is restricted. The first valve member 103 is inwardly spring-loaded by a helical compression spring 107, i.e. the first valve member 103 is spring-loaded in a direction away from the inlet 120. In other words, the first spring 107 acts on the first valve member 103 in an opposite direction to the receivable actuation force F. One end of the helical compression spring 107 acts on a radially extending projection 121 of the first valve member 103 and the other end acts on the third valve member 117.

The second valve member 105 is movable in the same axial direction as the first valve member 103. The second valve member 105 is arranged coaxially with the actuating rod 108 and the first valve member 103. The second valve member 105 is spring-loaded by a cup spring 113 against a second valve seat 106 in an axial direction towards the first valve member 103. In other words, the first and second valve members are both spring-loaded in a direction towards each other. The spring 113 acts in one end on a portion 109 of a valve housing 116 and in the other hand on the second valve member 105. The actuating rod 108 extends through the cup spring 113 and into the first valve member 103 where it is arranged in abutment with the first valve member 103. The first valve member 103 extends through a through hole of the second valve member 105. A normal flow passage is formed by the space between the wall of the through hole 110 and the first valve member 103. The second valve member 105 is provided with portions 115 extending into the chamber 102 and being arranged to slide along the walls of fastening element 118 in order to limit movement of the second valve member 105 in the radial direction, i.e. in order to limit the second valve member 105 to substantially axial movement. The first valve member 103 is provided with an annular closing surface 111 being defined by the portion of the projection 121 facing the second valve member 105. The closing surface 111 is tapered towards the second valve member 105.

FIG. 5 illustrates the valve device during normal operation. Normal operation with this embodiment is characterized in that:

an actuating force F≠0 is received by the actuating rod 108, thereby forcing the actuating rod 108 and the first valve member 103 towards the first valve seat 104, the spring 113 acts on the second valve member 105 in a direction towards the second valve seat 106, such that the second valve member 105 rests against the second valve seat 106, an inlet flow passage for the hydraulic fluid flow q to flow into the valve chamber 102 is formed by a restriction defined between the first valve seat 104 and the third valve member 117 in series with a passage through the through holes 123, the first valve member 103 is forced in abutment with the third valve member 117 by the received actuating force such that no hydraulic fluid flows into the valve chamber 102 via the through hole 119, and the normal flow passage formed by the space between the wall of the through hole 110 and the actuating rod 108 allows a hydraulic fluid flow q out of the chamber 102.

FIG. 6 illustrates the valve device during fail-safe operation. Fail-safe operation with this embodiment is characterized in that:

no actuating force is received by the actuating rod 108, i.e. F=0, the first valve member 103 is forced by the spring 108 against the second valve member 105 such that the normal flow passage formed by the space between the wall of the through hole 110 and the actuating rod 108 is closed, i.e. the annular closing surface 111 of the first valve member 103 is forced into contact with an edge of a through hole wall of the second valve member 105, the first valve member 103 is distanced from the first valve seat 104 and from the third valve member 117 such that two parallel flow paths are formed into the chamber 102, the first being formed by the space between the first valve seat 104 and the third valve member 117 in series with a passage through the through holes 123, and the second being formed by the through hole 119, thereby allowing a hydraulic fluid flow q into the chamber 102, a pressure P of the hydraulic fluid in the chamber 102 acts on both the first and second valve members such that the second valve member 105 is distanced from the second valve seat 106, and the spring 113 acts on the second valve member 105 in an opposite direction to the pressure-generated force acting thereon, such that the passage between the second valve member 105 and the second valve seat 106 is restricted, thereby allowing a restricted flow of hydraulic fluid q out of the chamber.

Figure 7:
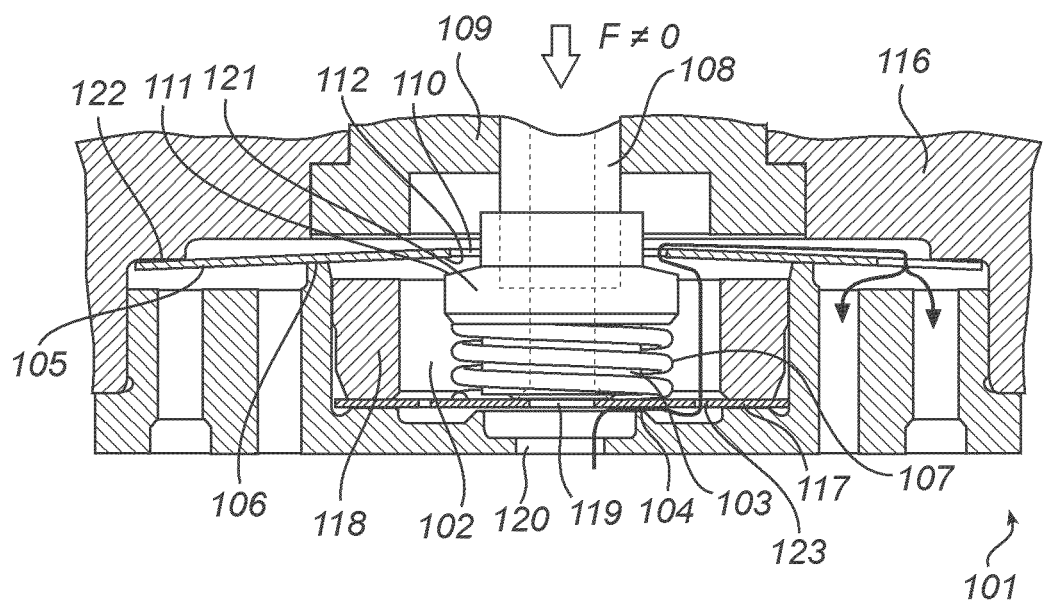
FIG. 7 is an illustration of a valve device in normal operation mode in accordance with yet another embodiment of the present invention.
Figure 8:
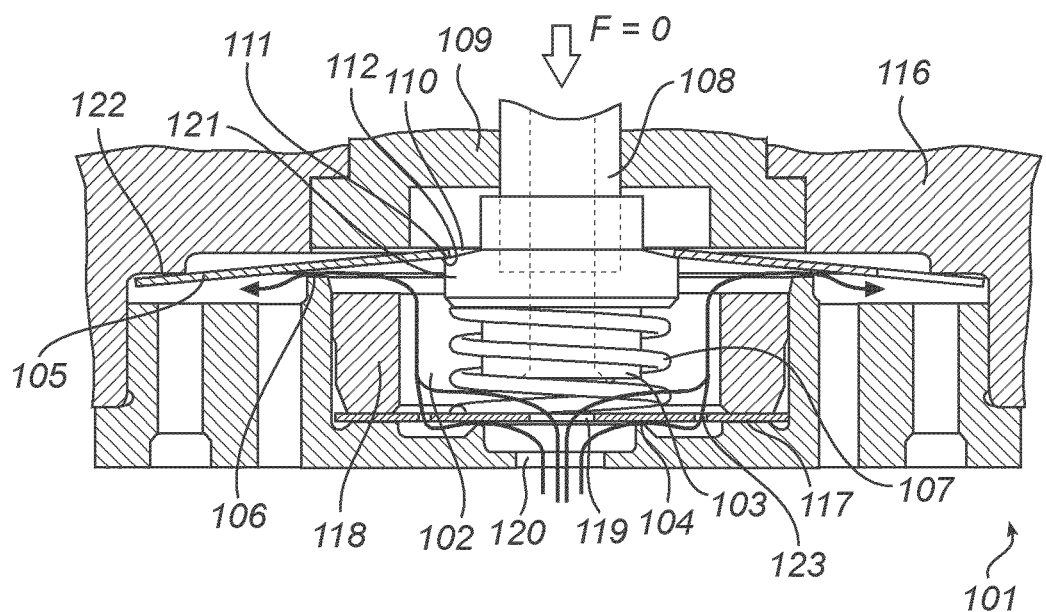
FIG. 8 is an illustration of the valve device according to FIG. 7 during fail-safe operation mode.

FIG. 7 and FIG. 8 illustrate a valve device 101 having a valve housing 116. A first circular valve member 103 is arranged within a valve chamber 102 arranged in the valve housing 116, where the first valve member 103 is movable within the valve chamber 102. The valve chamber 102 is defined by walls of the valve housing 116 and by a second valve member 105 forming a chamber wall portion. As mentioned above, the valve chamber wall portion thus forms a second valve member 105 which is movable relative the housing or the valve chamber wall 116.

The first valve member 103 is collinearly arranged in abutment with a circular actuating rod 108, through which an actuating force F is receivable. The actuating rod 108 is guided by a portion 109 of the valve housing 116, thereby limiting the actuating rod 108 and the first valve member 103 to be movable in the axial direction only. The first valve member 103 is thereby actuatable in an axial direction towards a circular first valve seat 104.

A disk-shaped third valve member 117 that is flexible in the axial direction is arranged in the chamber 102 between the first valve member 103 and the first valve seat 104. The third valve member 117 is fixed to the valve housing 116 by means of a circular fastening element 118 that is arranged to sandwich an annular portion of the third valve member 117 between the valve housing 116 and the fastening element 118. The fastening element 118 is fixed to the valve housing 116 by being wedged between the interior walls of the valve housing 116. The third valve member 117 comprises a through hole 119 in the centre of the valve member. The third valve member 117 further comprises additional through holes 123 being arranged at a larger radius than the radius of the first valve seat 104.

The valve chamber inlet 120 is arranged coaxially with the first valve seat 104, such that when the first valve member 103 is actuated to interact with the first valve seat 104 and the third valve member 117, the hydraulic fluid inlet flow to the valve chamber is restricted. The first valve member 103 is inwardly spring-loaded by a helical compression spring 107, i.e. the first valve member 103 is spring-loaded in a direction away from the inlet 120. In other words, the first spring 107 acts on the first valve member 103 in a direction opposite to the received actuation force F. One end of the helical compression spring 107 acts on a radially extending projection 121 of the first valve member 103 and the other end acts on the third valve member 117.

The second valve member 105 is disk-shaped and is flexible in the axial direction. The second valve member 105 is arranged coaxially with the actuating rod 108. The second valve member 105 is resiliently biased between an annular abutment element 122 and the second valve seat 106, thereby spring-loading the second valve member 105 against the second valve seat 106 in an axial direction towards the first valve member 103. In other words, the first and second valve members are both spring-loaded in a direction towards each other. The annular abutment element 122 has a larger radius than the second valve seat 106 and is arranged coaxially with the second valve seat 106. The annular abutment element 122 and the second valve seat 106 overlap each other in the axial direction, thereby the second valve member 105 may be biased there between. The actuating rod 108 extends through a circular through hole 110 of the second valve member 105. A normal flow passage is formed by the space between the wall of the through hole 110 and the actuating rod 108. The first valve member 103 is provided with an annular closing surface 111 defined by the portion of the projection 121 facing the second valve member 105. The closing surface 111 is tapered towards the second valve member 105.

FIG. 7 illustrates the valve device during normal operation. Normal operation with this embodiment is characterized in that:

an actuating force F≠0 is received by the actuating rod 108, thereby forcing the actuating rod 108 and the first valve member 103 towards the first valve seat 103, the second valve member 105 rests against the second valve seat 106, an inlet flow passage for the hydraulic fluid flow q into the valve chamber 102 is formed by a restriction defined between the first valve seat 104 and the third valve member 117 in series with a passage through the through holes 123, the first valve member is forced in abutment with the third valve member by the received actuating force such that no hydraulic fluid flows into the valve chamber 102 via the through hole 119, and the normal flow passage formed by the space between the wall of the through hole 110 and the actuating rod 108 allows a hydraulic fluid flow q out of the chamber 102.

FIG. 8 illustrates the valve device during fail-safe operation. Fail-safe operation with this embodiment is characterized in that:

no actuating force is received by the actuating rod 108, i.e. F=0, the first valve member 103 is forced by the spring 107 against the second valve member 105 such that the normal flow passage formed by the space between the wall of the through hole 110 and the actuating rod 108 is closed, i.e. the annular closing surface 111 of the first valve member 103 is forced into contact with an edge of the through hole wall of the second valve member 105, the first valve member 103 is distanced from the first valve seat 104 and from the third valve member 117 such that two parallel flow paths are formed into the chamber 102, the first being formed by the space between the first valve seat 104 and the third valve member 117 in series with a passage through the through holes 123, and the second being formed by the through hole 119, thereby allowing a hydraulic fluid flow q into the chamber 102, a pressure P of the hydraulic fluid in the chamber 102 acts on both the first and second valve members such that the second valve member 105 is distanced from the second valve seat 106, the spring-loading of the second valve member 105 counteracts the pressure-generated force acting thereon, such that passage between the second valve member 105 and the second valve seat 106 is restricted, thereby allowing a restricted flow q of hydraulic fluid out of the chamber 102.

Although exemplary embodiments of the present invention have been shown and described, it will be apparent to the person skilled in the art that a number of changes and modifications, or alterations of the invention as described herein may be made. For example the valve members may be spring-loaded by other types of spring means; the valve members, the actuating rod and the valve seats may be differently shaped; and the radial movement of the valve members may be limited by different means than in the above described embodiments. Thus, it is to be understood that the above description of the invention and the accompanying drawings is to be regarded as non-limiting examples thereof and that the scope of the invention is defined in the appended patent claims.

The invention claimed is:

1. A valve device for electrically regulating pressure of a hydraulic fluid flow through the valve device in response to an actuating force during normal operation and for mechanically regulating pressure during fail-safe operation when no actuating force is present, the valve device comprising:

a valve chamber;

a first valve member movable within the valve chamber in an axial direction and configured to interact with a first valve seat in response to an actuating force to allow hydraulic fluid flow into the valve chamber during normal operation, the first valve member being spring-loaded in a direction opposite of a direction of the actuating force; and a second valve member forming a movable wall portion of the valve chamber, the second valve member being spring-loaded against a second valve seat in the direction of the actuating force, the second valve member comprising a first through hole for allowing hydraulic fluid flow out of the valve chamber during normal operation, wherein the first valve member is arranged to close the first through hole during fail-safe operation such that the pressure is mechanically regulated by the second valve member acting on the second valve seat.

2. The valve device of claim 1, wherein the first valve member is spring-loaded by a first spring means.

3. The valve device of claim 2, wherein the first spring means is arranged between the first valve member and the first valve seat.

4. The valve device of claim 3, wherein a valve characteristic of the valve device is adjustable by selecting the first spring means from a group of first spring means having different spring characteristics.

5. The valve device of claim 1, wherein an actuating rod applies the actuating force to the first valve member.

6. The valve device of claim 5, wherein the actuating rod is guided by a valve device portion and the first valve member is guided by the actuating rod such that movement of the actuating rod and the first valve member is limited to the axial direction.

7. The valve device of claim 6, wherein the first valve member and the actuating rod extend through the first through hole in the second valve member.

8. The valve device of claim 7, wherein a flow passage is formed by a space between an inner wall portion of the first through hole and the actuating rod.

9. The valve device of claim 8, wherein the first valve member is provided with a first annular closing surface arranged to contact a second annular surface of the second valve member to close the flow passage.

10. The valve device of claim 9, wherein the first annular closing surface is tapered towards the flow passage.

11. The valve device of claim 10, wherein the second valve member is disk-shaped and flexible.

12. The valve device of claim 11, wherein the valve device further comprises an abutment element against which the second valve member is resiliently biased to spring-load the second valve member against the second valve seat.

13. The valve device of claim 12, wherein a valve characteristic of the valve device is adjustable by selecting the second valve member from a group of second valve members having different flexibility characteristics.

14. The valve device of claim 2, wherein the second valve member is spring-loaded against the second valve seat by a second spring means.

15. The valve device of claim 14, wherein the first spring means has a lower spring load than the second spring means.

16. The valve device of claim 15, wherein a valve characteristic of the valve device is adjustable by selecting the second spring means from a group of second spring means having different spring characteristics.

17. The valve device of claim 1, wherein the second valve member comprises at least one outflow orifice configured to allow hydraulic fluid flow out of the valve chamber.

18. The valve device of claim 1, wherein the valve device comprises at least one fixed restriction orifice configured to allow hydraulic fluid flow into the valve chamber.

19. The valve device of claim 18, wherein the first through hole is configured to unrestrictedly allow hydraulic fluid flow out of the valve chamber during normal operation relative to the restricted hydraulic fluid flow into the valve chamber.

20. The valve device of claim 18, wherein the first valve member and the first valve seat are arranged to unrestrictedly allow hydraulic fluid flow into the valve chamber during fail-safe operation relative to the restricted hydraulic fluid flow out of the valve chamber.

* * * * *